United States Patent
Tsai et al.

(10) Patent No.: US 7,487,478 B2
(45) Date of Patent: Feb. 3, 2009

(54) METHOD FOR DYNAMICALLY ADJUSTING PARAMETER VALUES OF PART HEIGHTS TO VERIFY DISTANCES BETWEEN PARTS

(75) Inventors: Chiu-Feng Tsai, Taipei (TW); Ming-Hui Lin, Taipei (TW)

(73) Assignee: Inventec Corporation, Taipei (TW)

( * ) Notice: Subject to any disclaimer, the term of this patent is extended or adjusted under 35 U.S.C. 154(b) by 151 days.

(21) Appl. No.: 11/378,388

(22) Filed: Mar. 20, 2006

(65) Prior Publication Data

US 2007/0220464 A1 Sep. 20, 2007

(51) Int. Cl.
*G06F 17/50* (2006.01)
(52) U.S. Cl. .............................. 716/5; 716/4
(58) Field of Classification Search ...................... 716/1, 716/4–6
See application file for complete search history.

(56) References Cited

U.S. PATENT DOCUMENTS

| | | | |
|---|---|---|---|
| 6,401,233 B1 * | 6/2002 | Suzuki et al. | 716/13 |
| 6,415,426 B1 * | 7/2002 | Chang et al. | 716/9 |
| 6,480,991 B1 * | 11/2002 | Cho et al. | 716/8 |
| 6,725,438 B2 * | 4/2004 | van Ginneken | 716/10 |

* cited by examiner

*Primary Examiner*—Jack Chiang
*Assistant Examiner*—Binh C Tat
(74) *Attorney, Agent, or Firm*—Rabin & Berdo, P.C.

(57) ABSTRACT

A method for dynamically adjusting parameter values of part heights to verify the distances between parts is provided. The method comprises, inputting multiple sets of limiting conditions for part heights through a setting interface; and verifying whether the parts are appropriately positioned in a circuit diagram according to the limiting conditions for part heights, thereby upgrading the quality of design of the printed circuit board and enhancing the reliability of electronic products.

5 Claims, 5 Drawing Sheets

METHOD FOR DYNAMICALLY ADJUSTING PARAMETER VALUES OF PART HEIGHTS TO VERIFY DISTANCES BETWEEN PARTS

BACKGROUND OF THE INVENTION

1. Field of Invention

The present invention relates to a verification method for a layout design, and more particularly, to a method for dynamically adjusting parameter values of part heights to verify the distances between parts.

2. Related Art

A printed circuit board (PCB) is a kind of circuit board formed as follows. A wiring diagram is depicted for the wirings connecting electronic parts according to a circuit design; and the electric conductors are reproduced on an insulator by way of mechanical processing, surface processing, and the like. In other words, the printed circuit board is used to enable an electronic circuit with electronic parts to play the role of each electronic assembly, so as to process signals, with the main function of fixing circuits between parts for providing a stable circuit environment.

However, the circuit diagram is embodied on a computer after being designed. When the positions of the parts are configured with a layout software, the position of each of the parts will directly affect the quality of the design of printed circuit boards, thereby influencing the reliability of electronic products, as well as the overall performance and competitiveness of system products.

Each of the parts is positioned according to some regulations when the printed circuit board is configured, in order to provide the printed circuit board with superior quality of design when embodied. Generally, as for those regulations, the safe distance between parts is enlarged to avoid mutual interference between parts on the printed circuit board. However, the arrangements of the heights of the parts are neglected. Therefore, parts with different heights are positioned on the printed circuit board at random or they are positioned excessively closely, which will increase the difficulty of repairing the printed circuit board in the future.

Although the positions of the parts with different heights are confirmed manually at present, thousands of parts with different heights in the circuit design diagram may still be positioned inappropriately due to personal carelessness.

Accordingly, in the prior art, parameter values are set for a set of part heights, and slopes of the corresponding parameter values of heights are calculated, and then based on the slopes corresponding to the parameter values of heights, the slope corresponding to the parameter value of each of the part heights is used to judge whether or not each of the parts is positioned appropriately. However, the distance between the parts will increase with the increase of the corresponding slope, resulting in waste of the space of the printed circuit board.

SUMMARY OF THE INVENTION

The present invention provides a method for dynamically adjusting parameter values of part heights to verify the distances between parts, which includes inputting limiting conditions for multiple sets of part heights, and inspecting whether the parts in a circuit diagram are positioned appropriately according to the limiting conditions, thereby upgrading the quality of design of the printed circuit board, and enhancing the reliability of the electronic products.

As for the method for dynamically adjusting parameter values of part heights to verify the distances between parts according to the present invention, the distances among all the parts in the configured circuit diagram and the corresponding height parameter values of each of the parts are obtained. The method is characterized in that:

Providing a setting interface to set several cluster values of height information, so as to produce several relative height intervals and limiting distances corresponding to the height intervals; then verifying the limiting distance corresponding to the height interval that the height parameter value of each of the parts belongs to and the corresponding distance between the parts, to produce a verification result; and carrying out a displaying process according to the verification result. In addition, the plurality of sets of parts are disposed on a PCB in the configured circuit diagram.

When the distance between one part and each of the other parts is greater than the limiting distance, a displaying process is carried out on said part for changing the display mode of the part, wherein the displaying process includes an inverse, an amplification, a flicker, a highlight, etc.

Furthermore, a verification result form is generated according to the verification result. The verification result form can be of the group consisting of characters, numerals, and letters.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

In order to the make the objects, the features, and the functions of the present invention more comprehensible, the embodiments are described in detail below. The illustration about the summary of the invention and the illustration about the embodiments are used to demonstrate and explain the principles of the present invention and further explain the claims of the present invention.

Figure 1:
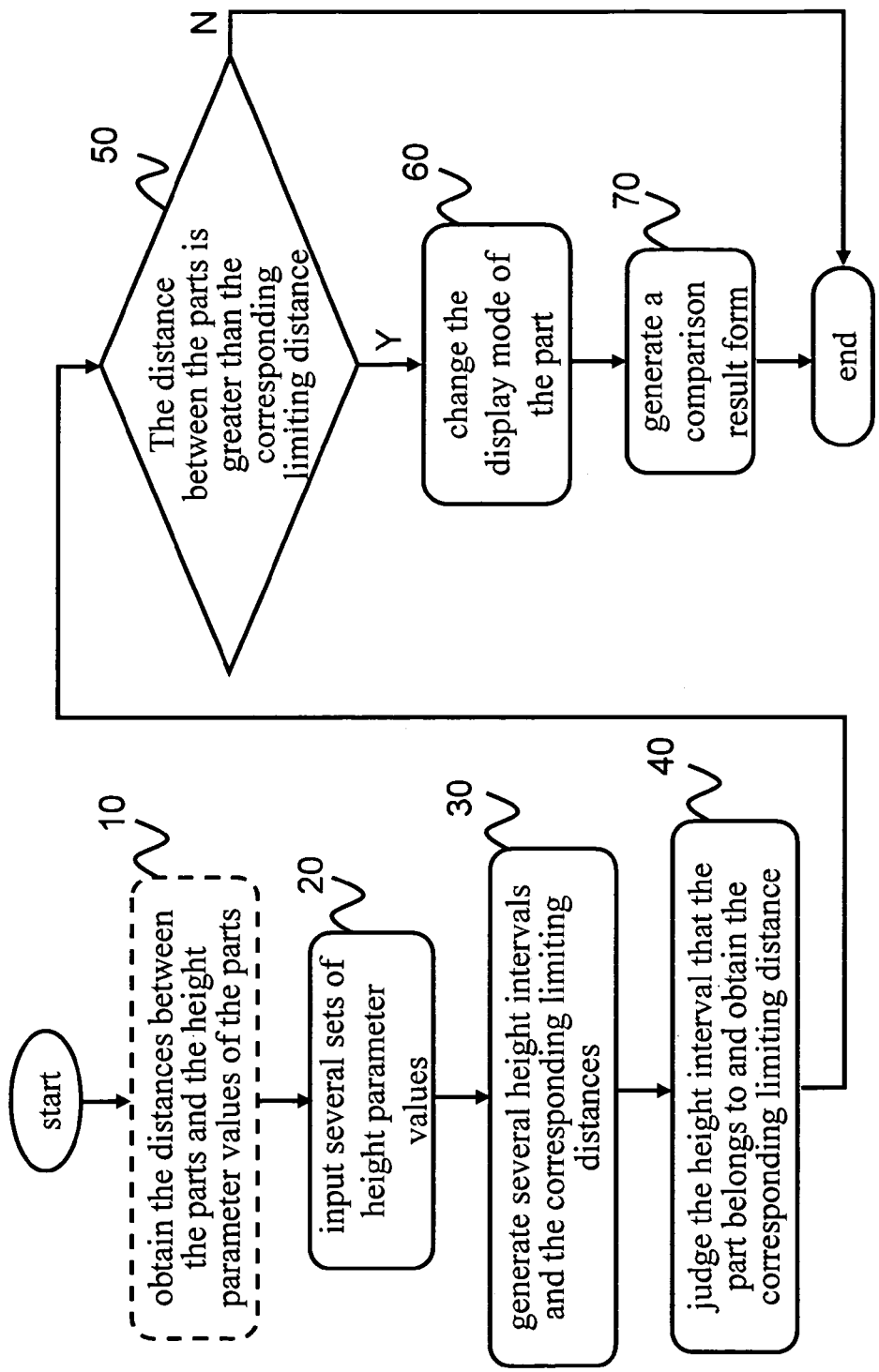
FIG. 1 is a flow chart of a method for dynamically adjusting the parameter values of the part heights to verify the distance between the parts according to the present invention.
Figure 2:
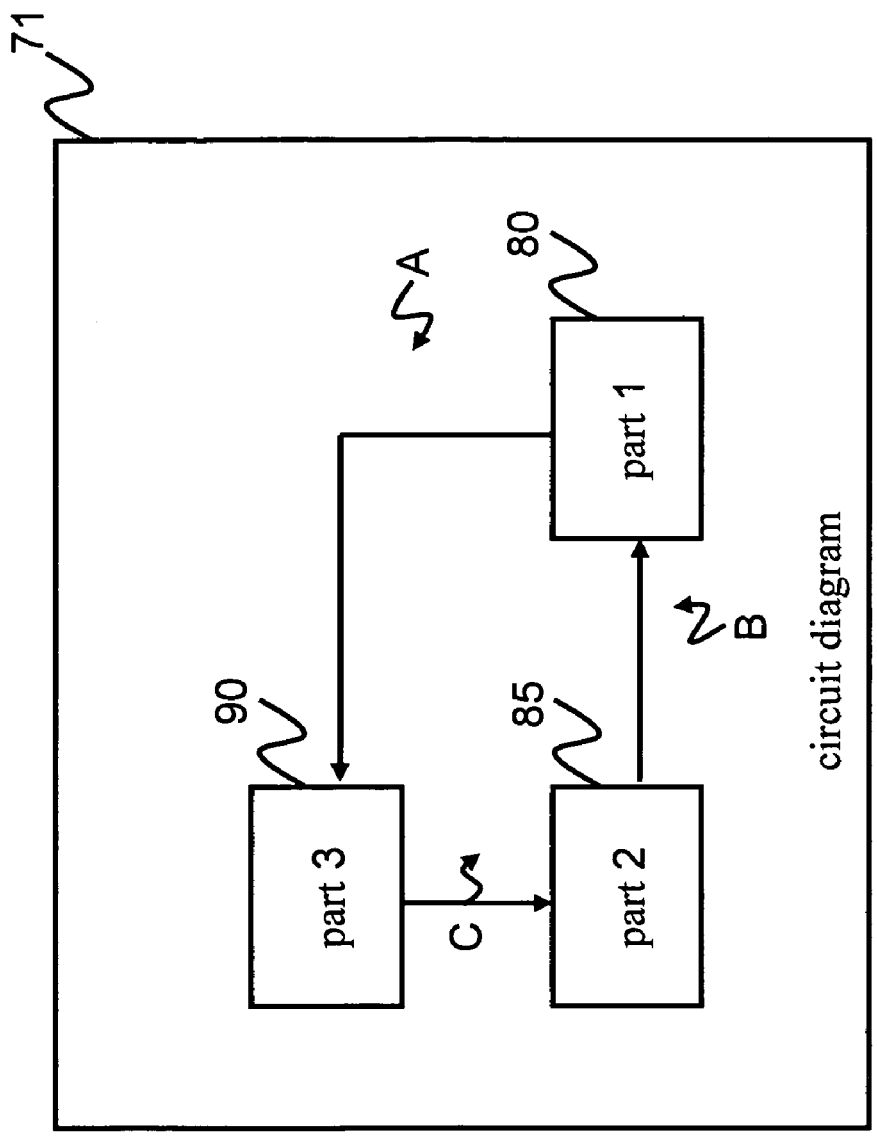
FIG. 2 is a circuit diagram of one embodiment according to the present invention.

Referring to FIGS. 1 and 2, they are a flow chart and an embodiment of the method for dynamically adjusting parameter values of part heights to verify the distances between the parts according to the present invention, and the method is used in a verification system for a layout design. In the embodiment, a configured circuit design diagram should be obtained, which includes Part 1 80, Part 2 85, and Part 3 90 as shown in FIG. 2. Each part has the corresponding distances A, B, and C with all the other parts, wherein Part 1 80, Part 2 85, and Part 3 90 have the corresponding height parameter values (Step 10).

Figure 3A:
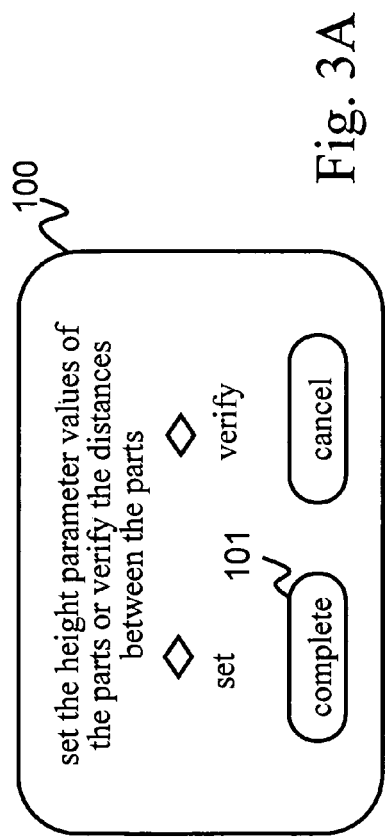
FIG. 3A shows a selection window of one embodiment according to the present invention.

When the designer intends to verify whether or not the distances between the parts in FIG. 2 and the arrangements of the heights are appropriate, the options of setting the height parameter values of the parts or verifying the distances between the parts can be selected through the selection window in FIG. 3A. When the option of setting the height parameter values of the parts is selected, the setting window 110 in FIG. 3B appears; i.e., the aforementioned setting interface. Then, several sets of cluster values of the part heights information are set in the setting window 110, that is, inputting the limiting conditions for several sets of part heights information. The part height information includes a highest height parameter value of the part, a lowest height parameter value of the part, a limiting distance value of the part, etc. (Step 20).

After the cluster values of several part heights information have been set, the verification system of layout design generates several corresponding height intervals, and limiting distance values corresponding to each of the height intervals (Step 30).

As for this embodiment, the designer inputs three sets of parameter values to set a part. That is, in the first set, the highest height parameter value of the part is 0.1, the lowest height parameter value of the part is 0.07, and the limiting distance value of the part is 0.015; in the second set, the highest height parameter value of the part is 0.059, the lowest height parameter value of the part is 0.03, and the limiting distance value of the part is 0.0125; in the third set, the highest height parameter value of the part is 0.029, the lowest height parameter value of the part is 0.01, and the limiting distance value of the part is 0.00625.

Figure 3B:
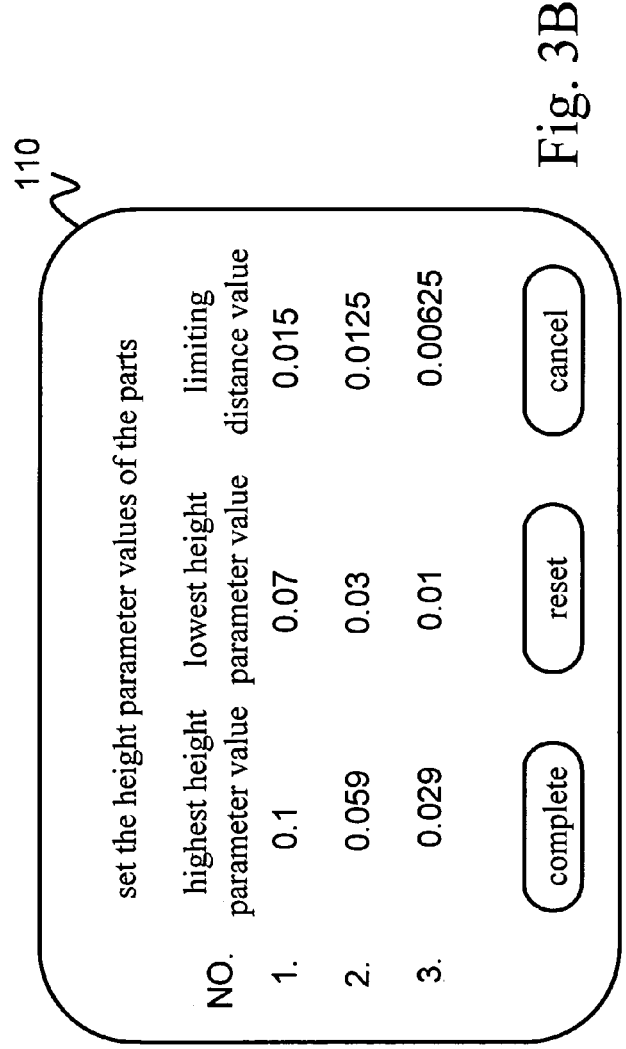
FIG. 3B shows a setting window of one embodiment according to the present invention.

The designer clicks the pattern Complete 101 of the setting window 110 in FIG. 3B after finishing the inputting process, and thus, the designer has finished setting the height parameter values of the parts and then returns to the selection window 100 in FIG. 3A. At this time, the verification system of layout design will immediately generate the height intervals corresponding to the first, second, and third sets of height parameter values of the parts and the limiting distances corresponding to each set of the height parameter values, for example, the limiting distances corresponding to the first, second, and third sets are 0.015, 0.0125, and 0.00625 respectively.

Next, after returning to the selection window 100 in FIG. 3A, the designer may once again select the option of setting the height parameter values of the parts or the option of verifying the distances between the parts. Verifying whether or not the distances between all parts conform to the set limiting distance is taken as an example below.

Subsequently, the height intervals that the height parameter values of the parts in Part 1 80, Part 2 85, and Part 3 90 belong to are confirmed according to the height intervals of the first, second, and third sets generated by the verification system of layout design, thereby obtaining the corresponding limiting distances of each of the parts. That is, Part 1 80 is judged to belong to one of the height intervals of the first, second, or third sets, thereby obtaining the corresponding limiting distance (Step 40).

For example, if Part 1 80, Part 2 85, and Part 3 90 belong to the height intervals of the first, second, and third sets, respectively, the corresponding limiting distances of Part 1 80, Part 2 85, and Part 3 90 are 0.015, 0.0125, and 0.00625, respectively.

Then, the corresponding distances between one part and each of the other parts are sequentially verified to generate a verification result, which shows whether or not the corresponding distances conform to the corresponding limiting distances of the height intervals that the part belongs to. A displaying process is conducted according to the verification result. That is, as shown in FIG. 2, the distances B and A between Part 1 80 and the neighboring parts, such as, Part 2 85 and Part 3 90 are compared with the corresponding limiting distance 0.015 of Part 1 80. In the same way, Part 2 85 and Part 3 90 are compared with the corresponding limiting distances 0.0125 and 0.00625 (Step 50).

Figure 4:
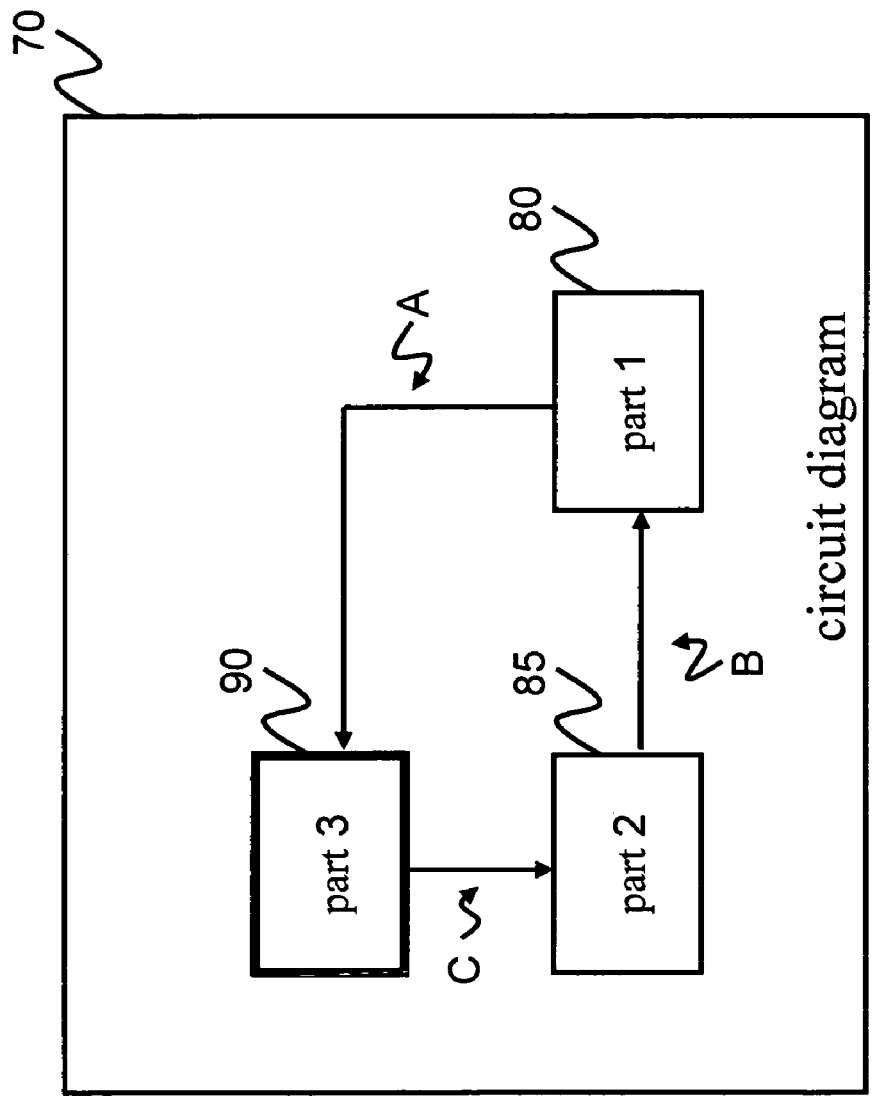
FIG. 4 shows a display mode of one embodiment according to the present invention.

If the distances A and C between Part 3 90 and the neighboring parts, such as, Part 1 80 and Part 2 85 are both greater than the corresponding limiting distance 0.00625, a displaying process is carried out to Part 3 90 for changing the display mode of the part. In the embodiment, as shown in FIG. 4, Part 3 90 is displayed to be highlighted and bold (Step 60). The displaying process includes amplification, a flicker, an inverse, etc.

Figure 5:
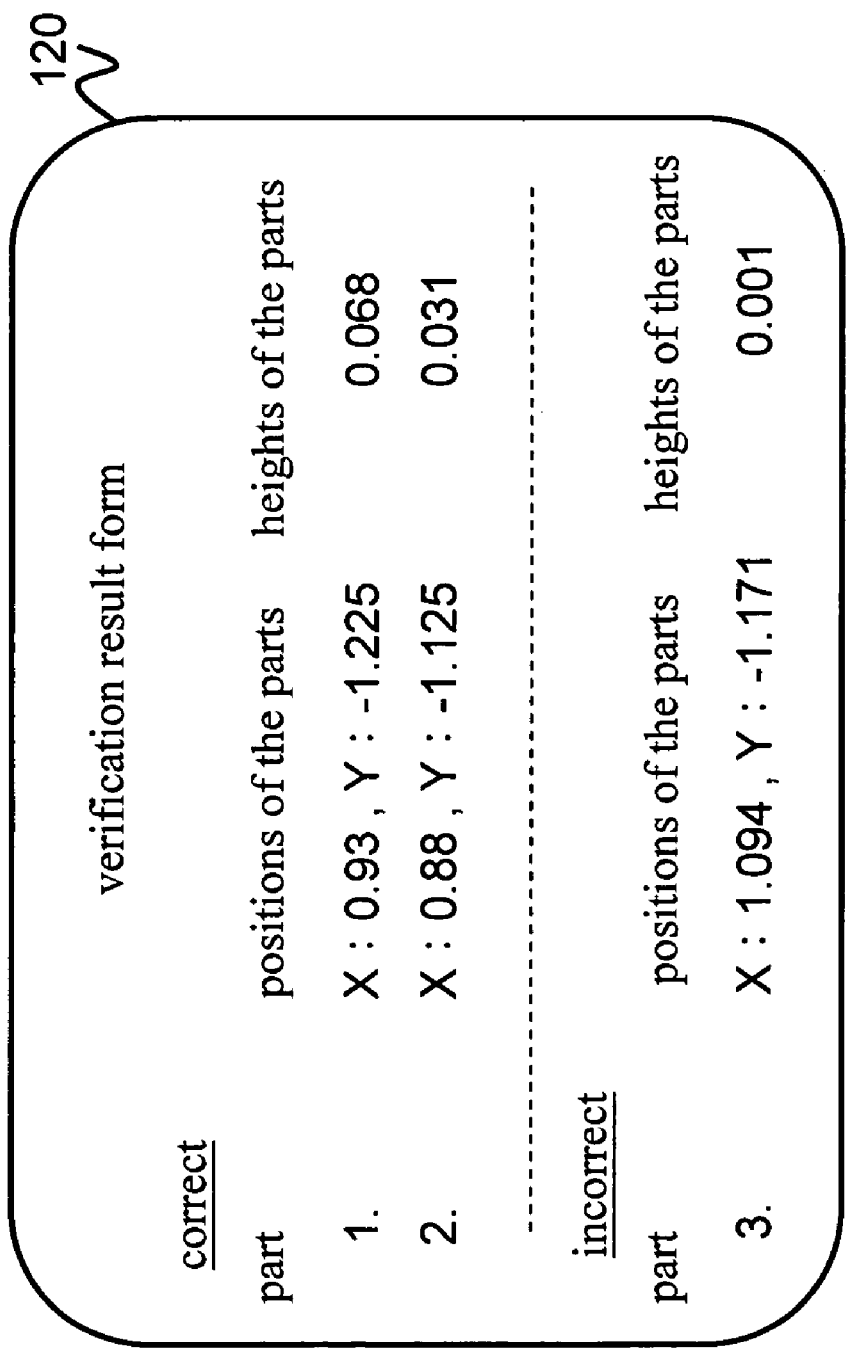
FIG. 5 shows a comparison result form of one embodiment according to the present invention.

After the parts in FIG. 2 have all been verified, a verification result form 120 is generated according to the verification result, as shown in FIG. 5 (Step 70). The content of the verification result form 120 can be selected from the group consisting of characters, numerals, and letters.

The present invention provides a method for dynamically adjusting parameter values of part heights to verify the distances between the parts, which includes setting limiting conditions for multiple sets of part heights for generating multiple height intervals, sequentially comparing and determining whether the distances between the parts conform to the corresponding limiting distances of the height intervals for each of the parts, so as to determine whether the parts with different heights in the circuit diagram are positioned appropriately, thereby upgrading the quality of design of the printed circuit board and then enhancing the reliability of the electronic products.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for dynamically adjusting parameter values of part heights to verify distances between parts, wherein a corresponding distance between each of a plurality of sets of parts in a configured circuit diagram and a corresponding height parameter value of each of the parts are obtained, the method comprising the steps of:

providing a setting interface to set a plurality of cluster values of height information for generating a plurality of corresponding height intervals, and a limiting distance corresponding to each of the height intervals, wherein the verification result form is generated according to the verification result, wherein the verification result is selected from the group consisting of characters, numerals, and letters;

then verifying the limiting distance corresponding to the height interval that the height parameter value of each of the parts belongs to and the corresponding distance between the parts, so as to generate a verification result, wherein when the corresponding distance between a part and each one of the parts is greater than the limiting distance, the displaying process is carried out to the part for changing the display mode of the part; and carrying out a displaying process according to the verification result.

2. The method for dynamically adjusting parameter values of part heights to verify the distances between the parts as claimed in claim 1, wherein the displaying process includes inverse, amplification, flicker, and highlight.

3. The method for dynamically adjusting parameter values of part heights to verify the distances between the parts as claimed in claim 1, wherein the cluster values of the part heights information include a highest height parameter value of a part, a lowest height parameter value of a part, and a limiting distance of a part.

4. The method for dynamically adjusting parameter values of part heights to verify the distances between parts as claimed in claim 1, wherein the part height information includes a highest height parameter value of the part, a lowest height parameter value of a part and a limiting distance value of the part.

5. The method for dynamically adjusting parameter values of part heights to verify the distances between parts as claimed in claim 1, wherein the plurality of sets of parts is disposed on a PCB in the configured circuit diagram.

* * * * *